United States Patent
Padmanabhan et al.

(10) Patent No.: US 11,138,473 B1
(45) Date of Patent: Oct. 5, 2021

(54) SYSTEMS AND METHODS FOR EXPERT-ASSISTED CLASSIFICATION

(71) Applicant: University of South Florida, Tampa, FL (US)

(72) Inventors: Balaji Padmanabhan, Tampa, FL (US); Utkarsh Shrivastava, Tampa, FL (US); Vivek Kumar Singh, Tampa, FL (US)

(73) Assignee: University of South Florida, Tampa, FL (US)

( * ) Notice: Subject to any disclaimer, the term of this patent is extended or adjusted under 35 U.S.C. 154(b) by 163 days.

(21) Appl. No.: 16/511,255

(22) Filed: Jul. 15, 2019

Related U.S. Application Data

(60) Provisional application No. 62/698,172, filed on Jul. 15, 2018.

(51) Int. Cl.
| | |
|---|---|
| *G06K 9/62* | (2006.01) |
| *G06N 5/02* | (2006.01) |
| *G06N 20/20* | (2019.01) |

(52) U.S. Cl.
CPC ......... *G06K 9/6263* (2013.01); *G06K 9/6267* (2013.01); *G06N 5/025* (2013.01); *G06N 20/20* (2019.01)

(58) Field of Classification Search
CPC .... G06K 9/6263; G06K 9/6267; G06N 5/025; G06N 20/20; A61B 5/7264
USPC .................................................. 382/159, 224
See application file for complete search history.

(56) References Cited

U.S. PATENT DOCUMENTS

| | | | |
|---|---|---|---|
| 2005/0228236 A1 | 10/2005 | Diederich et al. | |
| 2007/0112701 A1* | 5/2007 | Chellapilla | G06N 20/00 706/15 |
| 2010/0280335 A1 | 11/2010 | Carlson et al. | |
| 2012/0114250 A1 | 5/2012 | Zhong et al. | |
| 2016/0253466 A1* | 9/2016 | Agaian | G06N 5/043 382/128 |

(Continued)

FOREIGN PATENT DOCUMENTS

| | | |
|---|---|---|
| CN | 103426007 | 12/2016 |
| CN | 107274888 | 10/2017 |
| EP | 2450831 | 5/2012 |

OTHER PUBLICATIONS

Alpaydin, E., & Kaynak, C. (1998). Cascading Classifier. KYBERNETIKA, 34 (1998), 369-374.

(Continued)

*Primary Examiner* — Daniel G Mariam
(74) *Attorney, Agent, or Firm* — Meunier Carlin & Curfman LLC

(57) ABSTRACT

Systems and methods for expert-assisted classification are described herein. An example method for evaluating an expert-assisted classifier can include providing a cascade classifier including a plurality of classifier stages; and providing a simulated expert stage between at least two of the classifier stages. The simulated expert stage can be configured to validate or contradict an output of one of the at least two classifier stages. The method can also include classifying each of a plurality of records into one of a plurality of categories using the cascade classifier combined with the simulated expert stage; and determining whether the simulated expert stage improves performance of the cascade classifier.

19 Claims, 10 Drawing Sheets

(56) References Cited

U.S. PATENT DOCUMENTS

2018/0232812 A1* 8/2018 Erard .................. G06Q 40/08
2018/0276561 A1* 9/2018 Pasternack ............ G06N 20/20

OTHER PUBLICATIONS

Cai, X., Perez-Concha, O., Coiera, E., Martin-Sanchez, F., Day, R., Roffe, D., & Gallego, B. (2016). Real-time prediction of mortality, readmission, and length of stay using electronic health record data. Journal of the American Medical Informatics Association, 23(3), 553-561. http://dx.doi.org/10.1093/jamia/ocv110.

Chung, J. (2005). An exploration of accident and emergency nurse experiences of triage decision making in Hong Kong. Accident and Emergency Nursing, 13(4), 206-213. http://dx.doi.org/10.1016/J.aaen.2005.08.003.

Dittmar, M. S., Wolf, P., Bigalke, M., Graf, B. M., & Birkholz, T. (2018). Primary mass casualty incident triage: evidence for the benefit of yearly brief re-training from a simulation study. Scandinavian journal of trauma, resuscitation and emergency medicine, 26(1), 35.

Elkan, C. (Aug. 2001). The foundations of cost-sensitive learning. In International joint conference on artificial intelligence (vol. 17, No. 1, pp. 973-978). Lawrence Erlbaum Associates Ltd.

Farrohknia, N., Castrén, M., Ehrenberg, A., Lind, L., Oredsson, S., & Jonsson, H. et al. (2011). Emergency Department Triage Scales and Their Components: A Systematic Review of the Scientific Evidence. Scandinavian Journal of Trauma, Resuscitation and Emergency Medicine, 19(1), 42. http://dx.doi.org/10.1186/1757-7241-19-42.

Filannino, M., Stubbs, A., & Uzuner, Ö. (2017). Symptom severity prediction from neuropsychiatric clinical records: Overview of 2016 CEGS N-GRID shared tasks Track 2. Journal of Biomedical Informatics, 75 (2017) S62-S70. http://dx.doi.org/10.1016/j.jbi.2017.04.017.

Gall, C., Wetzel, R., Kolker, A., Kanter, R. K. & Toltzis, P. Pediatric Triage in a Severe Pandemic: Maximizing Survival by Establishing Triage Thresholds. Crit. Care Med. 44, 1762-8 (2016).

Goodwin, T. R., Maldonado, R., & Harabagiu, S. M. (2017). Automatic recognition of symptom severity from psychiatric evaluation records. Journal of Biomedical Informatics, 75, S71-S84. https://doi.org/10.1016/j.jbi.2017.05.020.

Gormican, S. P. (1982). CRAMS scale: field triage of trauma victims. Annals of emergency medicine, 11(3), 132-135.

Jain, H., Padmanabhan, B., Pavlou, P., & Santanam, R. (2018). Call for Papers—Special Issue of Information Systems Research—Humans, Algorithms, and Augmented Intelligence: The Future of Work, Organizations, and Society. Information Systems Research, 29(1), pp. 250-251.

Koehler, J. J., Baer, L. J., Malafa, S. A., Meindertsma, M. S., Navitskas, N. R., & Huizenga, J. E. (1986). Prehospital Index: a scoring system for field triage of trauma victims. Annals of emergency medicine, 15(2), 178-182.

Newgard, C. D. et al. The cost of overtriage: More than one-third of low-risk injured Patients were taken to major trauma centers. Health Aff. 32, 1591-1599 (2013).

Oliveira, L. S., Jr, A. S. B., & Sabourin, R. (2005). Improving Cascading Classifiers with Particle Swarm Optimization. In Eight International Conference on Document Analysis and Recognition (ICDAR'05), 5 pages.

Overall, J. E., & Gorham, D. R. (1962). The Brief Psychiatric Rating Scale. Psychological Reports, 10(3), 799-812. https://doi.org/10.1016/0165-1781(86)90091-0.

Pointer, J. E., Levitt, M. A., Young, J. C., Promes, S. B., Messana, B. J., & Adèr, M. E. (2001). Can paramedics using guidelines accurately triage patients? Annals of emergency medicine, 38(3), 268-277.

Pudil, P., Novovicova, J., Blaha, S., & Kittler, J. (1992). Multistage pattern recognition with reject option. Proceedings., 11th IAPR International Conference on Pattern Recognition. vol. II. Conference B: Pattern Recognition Methodology and Systems, 92-95. https://doi.org/10.1109/ICPR.1992.201729.

Rotondo, M., C., C. & Smith, R. Resources for optimal care of the injured patient ($1^{st}$ ed.). American College of Surgeons, Committee on Trauma. (2014).

Singh, V.K., Shrivastava, U., Bouayad, L., Padmanabhan, B., Ialynytchev, A. and Schultz, S.K., 2018. Machine learning for psychiatric patient triaging: an investigation of cascading classifiers. Journal of the American Medical Informatics Association, 25(11), pp. 1481-1487.

Uzuner, Ö., Stubbs, A., & Filannino, M. (2017). A natural language processing challenge for clinical records: Research Domains Criteria (RDoC) for psychiatry. Journal of Biomedical Informatics, 75, S1-S3. https://doi.org/10.1016/j.jbi.2017.10.005.

Viola, P., Way, O. M., & Jones, M. J. (2004). Robust Real-Time Face Detection. International Journal of Computer Vision, 57(2), 137-154.

* cited by examiner

```xml
<?xml version='1.0' encoding='UTF-8'?>
<RDoC>
<TEXT><![CDATA[
1|
Subject: Patient Initial Visit Note -Identifying information Date of Service: █
Age: █
Referral Source: ████████████████████████
(Patients own words)
We are ██████████████████████████████
████████████████████████████████████
███
.....
Hx of Suicidal Behavior: █
Hx of Non Suicidal Self Injurious Behavior: █
Violent Behavior Hx of Violent Behavior: █
-Psychiatric History Hx of Inpatient Treatment: █
Hx of Outpatient Treatment: █
Other Agency Involvement: █
Psychiatric Review of Systems DEPRESSION: Has the patient had periods of time lasting two weeks or longer in which, most of the day on most days, they felt little interest or pleasure in doing things, or they had to push themselves to do things: █
DEPRESSION: Has the patient had periods of time lasting two weeks or longer in which, most of the day on most days, they felt sad, down, or depressed: █
BIPOLAR: Has patient ever had a period of time when he/she felt "up" or "high" without the use of substances: █
...........
[report_end]
]]></TEXT>
<TAGS>
<POSITIVE_VALENCE annotated_by="2" score="MILD"/></TAGS>
</RDoC>
```

*FIG. 4*

APPENDIX 1

| Model | Accuracy | | | | | | | | | |
|---|---|---|---|---|---|---|---|---|---|---|
| | D1 | D2 | D3 | D4 | D5 | D6 | D7 | D8 | D9 | D10 |
| Nearest Neighbors | 35 % | 38 % | 29 % | 33 % | 42 % | 34 % | 32 % | 34 % | 35 % | 50 % |
| Linear SVM | 57 % | 41 % | 40 % | 55 % | 53 % | 54 % | 41 % | 53 % | 57 % | 56 % |
| RBF SVM | 40 % | 42 % | 40 % | 40 % | 40 % | 40 % | 40 % | 40 % | 40 % | 40 % |
| Decision Tree | 64 % | 36 % | 37 % | 67 % | 53 % | 67 % | 48 % | 64 % | 64 % | 50 % |
| Random Forest | 44 % | 43 % | 38 % | 52 % | 53 % | 46 % | 39 % | 47 % | 46 % | 44 % |
| Adaboost | 58 % | 45 % | 37 % | 60 % | 55 % | 62 % | 48 % | 63 % | 60 % | 53 % |
| Naive Bayes | 30 % | 18 % | 39 % | 33 % | 52 % | 43 % | 18 % | 26 % | 29 % | 22 % |
| LDA* | 57 % | 47 % | 37 % | 51 % | 57 % | 59 % | 47 % | 54 % | 56 % | 53 % |
| QDA** | 41 % | 41 % | 36 % | 41 % | 15 % | 41 % | 41 % | 40 % | 40 % | 41 % |

Note:
D1. Baseline + BPRS + Disorder history + Sentiment
D2. Disorder history+ Sentiment
D3. Sentiment
D4. Baseline
D5. BPRS
D6. Baseline + BPRS
D7. Disorder history
D8. Baseline + Disorder history
D9. Baseline + BPRS + Disorder history
D10. BPRS + Disorder history

* Linear Discriminant Analysis
** Quadratic Discriminant Analysis

FIG. 5

APPENDIX 2

| BPRS items description | | |
|---|---|---|
| Item | Description | Scale |
| Somatic concern | It rates the degree to which patient perceives her physical health problematic. | [1,7] |
| Anxiety | Patients reports apprehensions, tension, fear, panic, or worry. | [1,7] |
| Depression | Patient preoccupied with depressing topics such as sadness, unhappiness, anhedonia. | [1,7] |
| Suicidality | Patient expresses desire, intent, or actions to harm or kill self. | [1,7] |
| Guilt | Patient shows over concern or remorse for past behavior. | [1,7] |
| Hostility | Patient showing animosity, contempt, belligerence, threats, arguments, tantrums, property destruction, fight, or any other expression of hostile attitudes or action. | [1,7] |
| Elevated mood | Patient shows optimism which is out of proportion to the circumstances. | [1,7] |
| Grandiosity | Patient shows exaggerated self-opinion, self-enhancing conviction of special abilities and power or identity as someone rich and famous. | [1,7] |
| Suspiciousness | Patients shows beliefs that other persons have acted maliciously or with discriminatory intent. | [1,7] |
| Hallucinations | Patient reports of perceptual experiences in absence of relevant external stimuli. | [1,7] |
| Unusual thought content | Patient beliefs in delusional belief. | [1,7] |
| Bizarre behavior | Patient shows behavior which are odd, unusual, and psychotically criminal. | [1,7] |
| Self-neglect | Patient show below usual or below socially acceptable levels of hygiene, appearance, or eating behavior. | [1,7] |
| Disorientation | Patient does not comprehend situations and communications, and regarding person, place, or time. | [1,7] |
| Conceptual disorganization | The degree to which patients' speech is confused, disconnected, vague, and disorganized. | [1,7] |
| Blunted affect | The patient shows restricted expressiveness of face, voice, and gestures. | [1,7] |
| Emotional withdrawal | The patient shows deficiency in individual ability to relate emotionally during interview. | [1,7] |
| Motor retardation | Patient shows reduction in energy level such as slow movements or speech, reduced body tone, decreased number of spontaneous body movements. | [1,7] |
| Tension | The patient shows observable physical and motor manifestation of tension, nervousness, and agitation. | [1,7] |
| Unco-operativeness | The patient shows lack of willingness to co-operate with interview due to suspiciousness. | [1,7] |

*FIG. 6*

Table 1. Datasets details

| | Dataset | Details |
|---|---|---|
| 1 | Baseline | The features extracted from the psychiatric records. |
| 2 | BPRS | The features extracted based on brief psychiatric rating scale. |
| 3 | Disorder history | The features extracted based on disorder history. |
| 4 | Sentiment | The sentiment features extracted from the textual psychiatric data. |
| 5 | Baseline + BPRS | The features include baseline features and BPRS features. |
| 6 | Baseline + Disorder history | The features include baseline features and disorder history features. |
| 7 | BPRS + Disorder history | The features include BPRS features and disorder history features. |
| 8 | Disorder history + sentiment | The features include disorder history features and sentiment features. |
| 9 | Baseline + BPRS + Disorder history | The features include baseline features, BPRS features and disorder history features. |
| 10 | Baseline + BPRS + Disorder history+ Sentiment | The features include baseline feature, BPRS features, disorder history features, and sentiment analysis features. |

FIG. 7

| Table 2. EACC without expert | | | | |
|---|---|---|---|---|
| S.N. | Data Model | Order of Classifiers | Binary/Non-Binary | Accuracy |
| 1 | Baseline + BPRS + Disorder history + Sentiment | [(0, 'Decision Tree'), (1, 'Linear Discriminant Analysis'), (2, 'AdaBoost')] | Non-Binary | 67% |
| 2 | | [(3, 'Linear Discriminant Analysis'), (0, 'Decision Tree'), (1, 'AdaBoost')] | Binary | 68% |
| 3 | Baseline + BPRS + Disorder history | [(0, 'Decision Tree'), (1, 'Linear Discriminant Analysis'), (2, 'AdaBoost')] | Non-Binary | 68% |
| 4 | | [(3, 'AdaBoost'), (0, 'Decision Tree'), (1, 'Decision Tree')] | Binary | 68% |
| 5 | Baseline + BPRS | [(0, 'Decision Tree'), (3, 'Linear Discriminant Analysis'), (1, 'AdaBoost')] | Non-Binary | 68% |
| 6 | | [(3, 'AdaBoost'), (1, 'Random Forest'), (0, 'Decision Tree')] | Binary | 67% |
| 7 | Baseline + Disorder history | [(0, 'Decision Tree'), (3, 'Linear Discriminant Analysis'), (1, 'AdaBoost')] | Non-Binary | 71% |
| 8 | | [(3, 'Linear Discriminant Analysis'), (0, 'Decision Tree'), (1, 'AdaBoost')] | Binary | 69% |
| 9 | Baseline | [(0, 'Decision Tree'), (2, 'Random Forest'), (3, 'AdaBoost')] | Non-Binary | 67% |
| 10 | | [(2, 'Decision Tree'), (0, 'Decision Tree'), (3, 'AdaBoost')] | Binary | 64% |
| 11 | BPRS + Disorder history | [(0, 'RBF SVM'), (2, 'Linear SVM'), (1, 'AdaBoost')] | Non-Binary | 60% |
| 12 | | [(0, 'Nearest Neighbors'), (1, 'Decision Tree'), (2, 'Linear SVM')] | Binary | 61% |
| 13 | BPRS | [(3, 'Linear SVM'), (2, 'Linear Discriminant Analysis'), (0, 'AdaBoost')] | Non-Binary | 62% |
| 14 | | [(3, 'Naive Bayes'), (0, 'AdaBoost'), (1, 'Linear Discriminant Analysis')] | Binary | 61% |
| 15 | Disorder history + Sentiment | [(2, 'Random Forest'), (0, 'Linear SVM'), (1, 'Linear Discriminant Analysis')] | Non-Binary | 54% |
| 16 | | [(2, 'AdaBoost'), (1, 'Random Forest'), (0, 'Decision Tree')] | Binary | 53% |
| 17 | Disorder history | [(3, 'AdaBoost'), (1, 'Random Forest'), (0, 'Quadratic Discriminant Analysis')] | Non-Binary | 53% |
| 18 | | [(2, 'Nearest Neighbors'), (1, 'Random Forest'), (3, 'Nearest Neighbors')] | Binary | 55% |
| 19 | Sentiment | [(0, 'Naive Bayes'), (3, 'Naive Bayes'), (1, 'Random Forest')] | Non-Binary | 47% |
| 20 | | [(2, 'AdaBoost'), (0, 'Linear Discriminant Analysis'), (3, 'Random Forest')] | Binary | 47% |

*FIG. 8*

| Table 3. Evaluation of EACC with experts | | | | | | | |
|---|---|---|---|---|---|---|---|
| Model | Accuracy | | | | | | |
| | Without Expert | With Expert | | | | | |
| | | FPI=0.1 FNI=0.1 | Δ | FPI=0.5 FNI=0.5 | Δ | FPI=0.9 FNI=0.9 | Δ |
| 1 | 67 % | 75 % | + 8 % | 46 % | - 21 % | 31 % | - 36 % |
| 2 | 68 % | 74 % | + 6 % | 62 % | - 6 % | 47 % | - 21 % |
| 3 | 68 % | 76 % | + 8 % | 48 % | - 20 % | 28 % | - 40 % |
| 4 | 68 % | 68 % | 0 % | 61 % | - 7 % | 54 % | - 14 % |
| 5 | 68 % | 74 % | + 6 % | 56 % | - 12 % | 43 % | - 25 % |
| 6 | 67 % | 61 % | + 4 % | 53 % | - 14 % | 27 % | - 40 % |
| 7 | 71 % | 76 % | + 5 % | 62 % | - 9 % | 47 % | - 24 % |
| 8 | 69 % | 72 % | + 3 % | 60 % | - 9 % | 47 % | - 22 % |
| 9 | 67 % | 71 % | + 4 % | 60 % | - 7 % | 50 % | - 17 % |
| 10 | 64 % | 65 % | + 1 % | 64 % | 0 % | 51 % | - 13 % |
| 11 | 60 % | 61 % | + 1 % | 57 % | - 3 % | 50 % | - 10 % |
| 12 | 61 % | 67 % | + 6 % | 40 % | - 21 % | 28 % | - 33 % |
| 13 | 62 % | 64 % | + 2 % | 53 % | - 9 % | 45 % | - 17 % |
| 14 | 61 % | 74 % | + 13 % | 58 % | - 3 % | 42 % | - 19 % |
| 15 | 54 % | 52 % | - 2 % | 51 % | - 3 % | 47 % | - 7 % |
| 16 | 53 % | 56 % | + 3 % | 46 % | - 7 % | 16 % | - 37 % |
| 17 | 53 % | 64 % | + 11 % | 33 % | - 20 % | 9 % | - 44 % |
| 18 | 55 % | 56 % | + 1 % | 39 % | - 16 % | 16 % | - 39 % |
| 19 | 47 % | 50 % | + 3 % | 43 % | - 5 % | 35 % | - 12 % |
| 20 | 47 % | 44 % | - 3 % | 40 % | - 7 % | 40 % | - 7 % |

*FIG. 9*

| Table 4. Notation table | |
|---|---|
| $N$ | Number of samples for classification |
| $i$ | Set of system and expert. $i = \{system, expert\}$ |
| $FP_c$ | False positive of classifier c. |
| $FN_c$ | False negative of classifier c. |
| $TP_c$ | True positive of classifier c. |
| $TN_c$ | True negative of classifier c. |
| $\delta_{FP,c}$ | False Positive Indicator rate of the classifier c, which is equal to the ratio of number of False Positives cases classified over the total number of cases. $$\delta_{FP,c} = \frac{FP_c}{N} ; c \in i.$$ |
| $\delta_{FN,c}$ | False Negative Indicator rate of the classifier c, which is equal to the ratio of number of False Negative cases classified over the total number of cases. $$\delta_{FN,c} = \frac{FN_c}{N} ; c \in i.$$ |
| $\delta_{TP,c}$ | True Positive Indicator rate of the classifier c, which is equal to the ratio of the number of True Positive cases classified over the total number of cases. $$\delta_{TP,c} = \frac{TP_c}{N} ; c \in i.$$ |
| $\delta_{TN,c}$ | True Negative Indicator rate of the classifier c, which is equal to the ratio of the number of True Negative cases classified over the total number cases $$\delta_{TN,c} = \frac{TN_c}{N} ; c \in i$$ |
| $Accuracy_c$ | It is defined as sum of number of False Positive cases and False Negative cases over the total number of cases. $$Accuracy_c = \frac{TP_c + TN_c}{N}$$ |

*FIG. 10*

SYSTEMS AND METHODS FOR EXPERT-ASSISTED CLASSIFICATION

CROSS-REFERENCE TO RELATED APPLICATIONS

This application claims the benefit of U.S. provisional patent application No. 62/698,172, filed on Jul. 15, 2018, and entitled "SYSTEMS AND METHODS FOR EXPERT-ASSISTED CLASSIFICATION," the disclosure of which is expressly incorporated herein by reference in its entirety.

BACKGROUND

Triaging in healthcare is an important process of determining the severity of patients before routing them to appropriate treatment pathway. It is conducted by medical personnel including doctors, nurses, and paramedics (Gall et al. 2016). In healthcare, various scoring systems have been developed to assist in triage decision making (Gormican 1982; Koehler et al. 1986). Undertriage and Overtriage are two forms of mistriage. In case of Undertriage, a patient is labelled with lower severity category compared to actual severity, however, in Overtriage, a low severity patient is labelled as high severity (Rotondo and Smith 2014; Newgard et al. 2013). There are multiple challenges in manual triaging process including, but not limited to, lack of resources for triaging in healthcare institutions and triage accuracy of healthcare personals. Re-education of triage personnel is required at regular time period to maintain the high level of triage accuracy (Dittmar et al. 2018).

Machine learning (ML) and/or classification models can be used in applications such as healthcare triaging, where a data point needs to be correctly classified into one of a plurality of categories. In the medical patient triaging application, the categories may be severe, moderate, mild, absent, etc. ML and/or classification models can be applied to automatically (and without human intervention) categorize data points into severe, moderate, mild, absent, etc. categories.

SUMMARY

An expert-assisted classifier is described herein. An example method can include providing a cascade classifier including a plurality of classifier stages; and providing a simulated expert stage between at least two of the classifier stages. The simulated expert stage can be configured to validate or contradict an output of one of the at least two classifier stages. The method can also include classifying each of a plurality of records into one of a plurality of categories using the cascade classifier combined with the simulated expert stage; and determining whether the simulated expert stage improves performance of the cascade classifier.

In some implementations, the simulated expert stage can be configured to model human-expert performance. Optionally, the human-expert performance can be modeled with a plurality of levels of accuracy. Alternatively or additionally, the human-expert performance can be modeled using a plurality of parameters. For example, the parameters can include False Positive Indicator (FPI) rate, False Negative Indicator (FNI) rate, True Positive Indicator (TPI) rate, and True Negative Indicator (TNI) rate.

Alternatively or additionally, the method can further include providing a respective simulated expert stage between each pair of the classifier stages.

Alternatively or additionally, the method can optionally further include selecting an order for the classifier stages to improve performance of the expert-assisted classifier.

Alternatively or additionally, the method can optionally further include selecting an order for the classifier stages based on pre-determined criteria.

Alternatively or additionally, the method can optionally further include selecting a machine learning algorithm for use by at least one of the classifier stages from a plurality of machine learning algorithms. The machine learning algorithms can include a plurality of supervised binary class/multiclass classification algorithms. In some implementations, the selected machine learning algorithm can improve performance of the at least one of the classifier stages. In some implementations, the selected machine learning algorithm can improve performance of the expert-assisted classifier. Alternatively or additionally, the machine learning algorithm can be selected based on a feature set analyzed by the at least one of the classifier stages.

Alternatively or additionally, each of the classifier stages can be a binary classifier stage.

Alternatively or additionally, in some implementations, if the simulated expert stage is determined to improve performance of the cascade classifier, the method can optionally further include receiving an input from a domain expert between the at least two of the classifier stages. The input from the domain expert can validate or contradict the output of one of the at least two classifier stages.

An example method for performing expert-assisted classification is described herein. The method can include using a cascade classifier to classify a record into one of a plurality of categories. The cascade classifier can include a plurality of classifier stages. The method can also include receiving an input from a domain expert between at least two of the classifier stages. The input from the domain expert can validate or contradict an output of one of the at least two classifier stages.

Additionally, each of the classifier stages can be a binary classifier stage.

Alternatively or additionally, each of the classifier stages can be configured to execute a machine learning algorithm selected from a plurality of machine learning algorithms. The machine learning algorithms can include a plurality of supervised binary class/multiclass classification algorithms.

Alternatively or additionally, in some implementations, if the input from the domain expert validates the output of one of the at least two classifier stages, the method can optionally further include confirming the record's classification.

Alternatively or additionally, in some implementations, if the input from the domain expert contradicts the output of one of the at least two classifier stages, the method can optionally further include passing the record to a next classifier stage.

Alternatively or additionally, the method can optionally further include providing feedback to the domain expert. The feedback can include criteria supporting the output of one of the at least two classifier stages. Optionally, the method can further include monitoring the domain expert's performance.

Alternatively or additionally, the cascade classifier can be configured to triage a severity level of a medical condition.

Alternatively or additionally, the cascade classifier can be configured to route or prioritize an information technology (IT) service request.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4 is an example de-identified Initial Psychiatric Evaluation (IPE) Record according to an implementation described herein.

FIG. 5 is a table illustrating the accuracy of classification of a plurality of different datasets using different machine learning algorithms.

FIG. 6 is a table illustrating Brief Psychiatric Rating Scale (BPRS) feature descriptions.

FIG. 7 is a table illustrating features categorized into different datasets.

FIG. 8 is a table illustrating the result of EACC model without expert according to an implementation described herein.

FIG. 9 is a table illustrating the result of EACC model with expert according to an implementation described herein.

FIG. 10 is a notation table.

DETAILED DESCRIPTION

Figure 1:
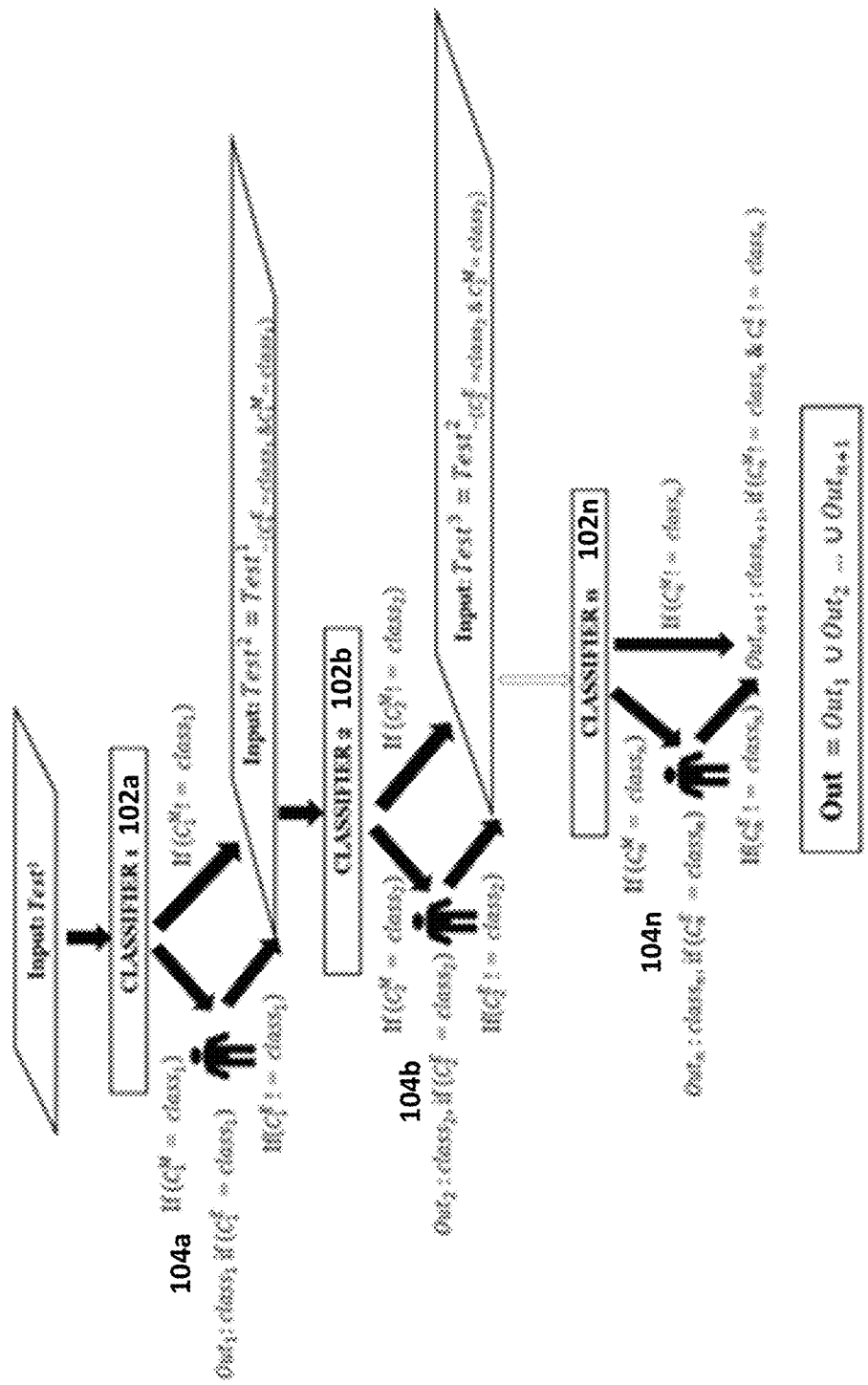
FIG. 1 is a diagram illustrating example operations for evaluating an expert-assisted classifier according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for expert-assisted classification of psychiatric patient records, it will become evident to those skilled in the art that the implementations are not limited thereto, but are applicable for other applications including, but not limited to, IT helpdesk support requests, fraud detection, or screening/monitoring of suspicious transactions.

An expert assisted cascading classifier (EACC) approach described herein is a multistage multiclass cascading classification technique that achieves higher triage classification accuracy compared to traditional multiclass classifiers for a number of reasons including, but not limited to, (1) leveraging differences between a specific classification category (or class) and remaining categories by classifying one category at a time (e.g., using sequential stages), (2) identifying and applying classifiers at each stage to improve overall accuracy, (3) identifying and applying different features in each stage, and (4) providing a framework to involve domain experts to improve overall accuracy.

As described herein, in some circumstances, the classifier (e.g., EACC) can be improved by including domain expert(s), while in other circumstances, the classifier's performance can worsen by including domain expert(s). Accordingly, it is beneficial to identify circumstances where soliciting the input of domain experts improves performance of the classifier system. In these circumstances, an EACC (i.e., combined ML and domain expert) can be used for classification. If the domain expert(s) would worsen performance, then classification can be performed by a machine or expert only. In other words, the techniques for evaluating expert-assisted classifiers as described herein can be used to determine circumstance under which augmenting a classifier with human expert would improve performance of the classifier system.

Referring now to FIG. 1, a diagram illustrating example operations for evaluating an expert-assisted classifier are shown. This disclosure contemplates that the example operations can be performed using one or more computing devices such as computing device 300 shown in FIG. 3. The operations can include providing a cascade classifier including a plurality of classifier stages 102a, 102b, ... 102n. The cascade classifier shown in FIG. 1 includes three classifier stages. It should be understood that three classifier stages are provided only as an example and that the cascade classifier can include more or less than three classifier stages. As described herein, the cascade classifier can be a sequential or multi-stage classifier, where the output of a prior stage (e.g., the output of Classifier 1 in FIG. 1) informs the next stage (e.g., Classifier 2 in FIG. 1).

Each of the classifier stages 102a, 102b, ... 102n (i.e., Classifier 1, Classifier 2, ... Classifier n) can be a binary classifier stage. As one example, for psychiatric patient triage applications, each binary classifier stage distinguishes between a target class (e.g., severe, moderate, mild, or absent) and the rest of the classes. For example, with reference to FIG. 1, Classifier 1 can distinguish between severe cases and moderate, mild, and absent cases; Classifier 2 can distinguish between moderate cases and mild and absent cases; and Classifier n can distinguish between mild cases and absent cases. As described herein, each of the classifier stages 102a, 102b, ... 102n can implement a machine learning algorithm. The operations can include selecting a machine learning algorithm for use by at least one of the classifier stages 102a, 102b, ... 102n from a plurality of machine learning algorithms. In some implementations, the selected machine learning algorithm can improve performance of the classifier stage. In other implementations, the selected machine learning algorithm can improve performance of the expert-assisted classifier. Alternatively or additionally, the machine learning algorithm can be selected based on a feature set analyzed by the classifier stage.

The machine learning algorithms can include binary class/multiclass classification algorithms. Example supervised binary class/multiclass classification algorithms include, but are not limited to, Nearest Neighbor, radial base function (RBF) support vector machine (SVM), Decision Tree, Random Forest, Naïve Bayes, Quadratic Discriminant Analysis, Linear SVM, Linear Discriminant Analysis, and AdaBoost. These example algorithms are known in the art and are therefore not descried in further detail below. It should be understood that the machine learning algorithms provided above are only examples. This disclosure contemplates that the classifier stages can implement other machine learning algorithms. Optionally, in some implementations, the operations can include selecting an order for the classifier stages 102a, 102b, . . . 102n to improve performance of the expert-assisted classifier. This disclosure contemplates that a data set can be processed by the cascade classifier with the classifier stages 102a, 102b, . . . 102n in various orders to determine which order of the classifier stages 102a, 102b, . . . 102n provides the best performance. Alternatively, in other implementations, the operations can include selecting an order for the classifier stages 102a, 102b, . . . 102n based on pre-determined criteria. For example, the classifier stages 102a, 102b, . . . 102n can be ordered as required and/or desired by a user or classification system.

The operations can also include providing a simulated expert stage 104 between at least two of the classifier stages 102a, 102b, . . . 102n. In some implementations, this disclosure contemplates providing a simulated expert stage 104 between only two of the classifier stages 102a, 102b, . . . 102n. In other implementations, this disclosure contemplates providing a respective simulated expert stage 104 between more than two pairs of the classifier stages 102a, 102b, . . . 102n. Optionally, the number of simulated expert stages 104 is one less than the number of classifier stages 102a, 102b, . . . 102n, e.g. when a respective simulated expert stage 104 is provided between each of the classifier stages 102a, 102b, . . . 102n. As described herein, a simulated expert (e.g., a model) is not an actual domain expert (e.g., human). A simulated expert can be used to evaluate the expert-assisted classifier to determine whether or not to solicit input from domain expert(s) during classification. Simulated expert stages are also referred to individually and collectively herein as simulated expert stage(s) 104. As shown in FIG. 1, simulated expert stage 104a is provided between classifier stages 102a and 102b, simulated expert stage 104b is provided between classifier stages 102b and 102n, and simulated expert stage 104n is provided after classifier stage 102n. In other words, a simulated expert stage 104 is provided for each respective classifier stage shown in FIG. 1. This disclosure contemplates that a simulated expert stage 104 can be provided for one or more of the classifier stages. As one example, for psychiatric patient triage applications, simulated expert stage 104a is a "severe" case expert, simulated expert stage 104b is a "moderate" case expert, and simulated expert stage 104n is a "mild" case expert. The expert-assisted classifier shown in FIG. 1 includes three simulated experts 104, e.g., simulated experts 104a, 104b, . . . 104n corresponding to each of the classifier stages 102a, 102b, . . . 102n. It should be understood that three simulated experts are provided only as an example and that the expert-assisted classifier can include more or less than three simulated experts 104a, 104b, . . . 104n.

The simulated expert stage 104 can be configured to validate or contradict an output of one of the at least two classifier stages 102a, 102b, . . . 102n. As shown in FIG. 1, simulated expert stage 104a can validate or contradict the output of classifier stage 102a, simulated expert stage 104b can validate or contradict the output of classifier stage 102b, and simulated expert stage 104n can validate or contradict the output of classifier stage 102n. The simulated expert stage 104 can be configured to model human-expert performance. Optionally, the human-expert performance can be modeled with a plurality of levels of accuracy (e.g., different levels of accuracy). This disclosure contemplates that different experts may have different levels of accuracy. Accordingly, by modeling human-expert performance with different accuracies, the expert-assisted classifier can be evaluated under different conditions. As described herein, the human-expert performance can be modeled using a plurality of parameters. For example, the parameters can include False Positive Indicator (FPI) rate, False Negative Indicator (FNI) rate, True Positive Indicator (TPI) rate, and True Negative Indicator (TNI) rate.

The operations can also include classifying each of a plurality of records into one of a plurality of categories using the cascade classifier combined with the simulated expert stage 104. As described herein, if a classifier stage is validated by a simulated expert stage, then the output of the classifier stage is confirmed. On the other hand, if a classifier stage is contradicted by a simulated expert stage, then classification proceeds to the next classifier stage. The objective of the evaluation is to understand whether an expert (e.g., a human expert) would improve or worsen performance of the cascade classifier. As described herein, this depends, at least in part, on the accuracy level of the expert. Thus, the operations can also further include determining whether the simulated expert stage 104 improves performance of the cascade classifier. If the simulated expert stage 104 is determined to improve performance of the cascade classifier, the operations can include receiving an input from a domain expert between the at least two of the classifier stages 102a, 102b, . . . 102n. The input from the domain expert can validate or contradict the output of one of the at least two classifier stages 102a, 102b, . . . 102n. If the simulated expert stage 104 is determined to worsen performance of the cascade classifier, there is no need to solicit input from a domain expert, i.e., the cascade classifier alone achieves better results.

Figure 2:
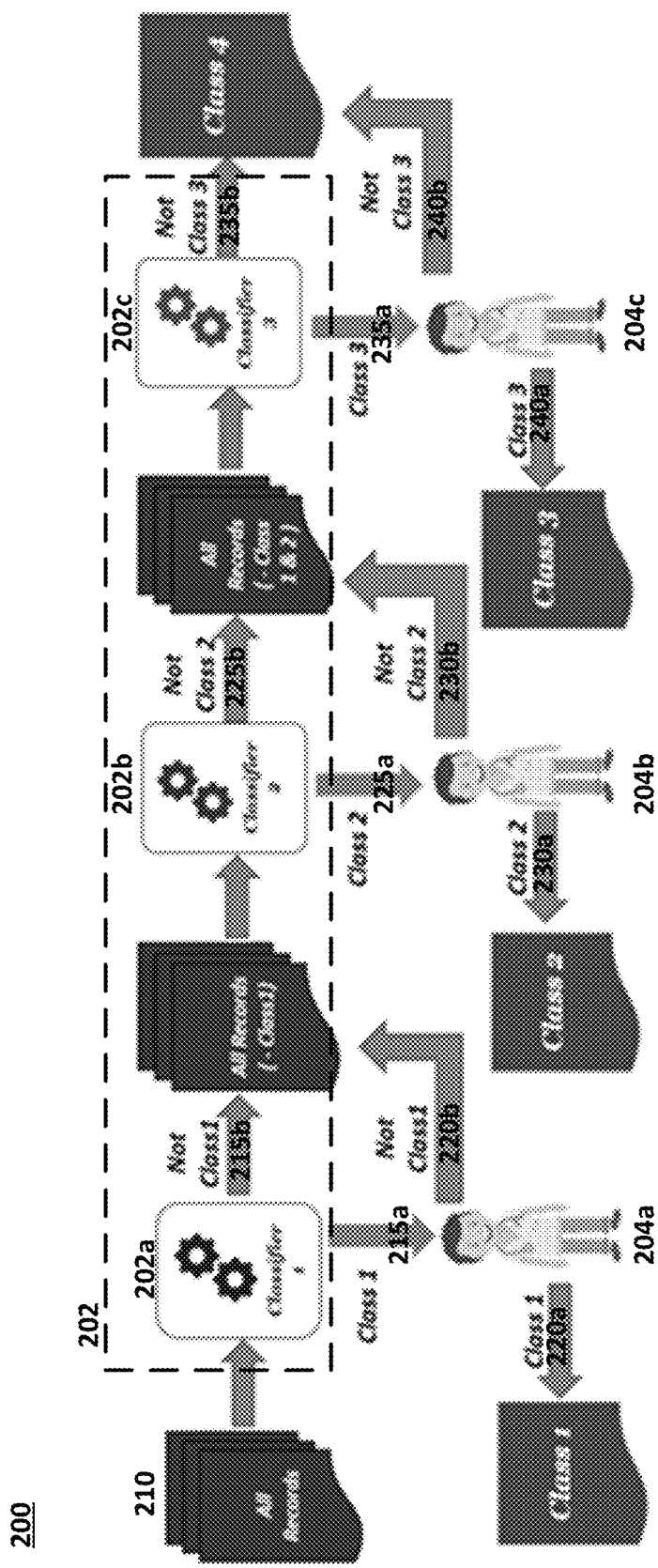
FIG. 2 is a diagram illustrating an expert-assisted classifier architecture according to an implementation described herein.

Referring now to FIG. 2, a diagram illustrating an expert-assisted classifier 200 are shown. As described herein, it may be appropriate to use the expert-assisted classifier 200 when such a classifier has been evaluated as likely to improve performance. This evaluation can be performed using the operations described above with regard to FIG. 1. The expert-assisted classifier 200 can include a cascade classifier 202, which includes a plurality of classifier stages 202a, 202b, 202c. This disclosure contemplates that the cascade classifier 202 can be implemented using one or more computing devices such as computing device 300 shown in FIG. 3. Cascade classifiers are described in detail above with regard to FIG. 1. For example, each of the classifier stages 202a, 202b, 202c (i.e., Classifier 1, Classifier 2, Classifier 3) can be a binary classifier stage. As one example, for psychiatric patient triage applications, each binary classifier stage distinguishes between a target class (e.g., severe, moderate, mild, or absent) and the rest of the classes. For example, with reference to FIG. 2, Classifier 1 can distinguish between severe cases and moderate, mild, and absent cases; Classifier 2 can distinguish between moderate cases and mild and absent cases; and Classifier 3 can distinguish between mild cases and absent cases. As described herein, each of the classifier stages 202a, 202b, 202c can implement a machine learning algorithm, e.g., a binary class/multiclass classification algorithms. Example supervised binary class/multiclass classification algorithms include, but are not limited to, Nearest Neighbor, radial base function (RBF) support vector machine (SVM), Decision Tree, Random Forest, Naïve Bayes, Quadratic Discriminant Analysis, Linear SVM, Linear Discriminant Analysis, and AdaBoost. It should be understood that the machine learning algorithms provided above are only examples. This disclosure contemplates that the classifier stages can implement other machine learning algorithms. The cascade classifier 202 shown in FIG. 2 includes three classifier stages. It should be understood that three classifier stages are provided only as an example and that the cascade classifier can include more or less than three classifier stages.

The expert-assisted classifier 200 can solicit input from one or more domain experts 204a, 204b, 204c. Domain experts can be humans with expertise in certain applications (e.g., psychiatry, IT, etc.). As described below, the domain experts can provide input, which either validate or contradicts the output of a classifier stage. Domain experts are sometimes collectively or individually referred to herein as domain expert(s) 204. As shown in FIG. 2, domain expert 204a is provided after classifier stage 202a, domain expert 204b is provided after classifier stage 202b, and domain expert 204c is provided after classifier stage 202c. As one example, for psychiatric patient triage applications, domain expert 204a is a "severe" case expert, domain expert 204b is a "moderate" case expert, and domain expert 204c is a "mild" case expert. This disclosure contemplates that the domain expert 204 can be the same or different person. The expert-assisted classifier shown in FIG. 2 includes three domain experts 204, e.g., domain experts 204a, 204b, 204c for each of the classifier stages 202a, 202b, 202c. It should be understood that three domain experts are provided only as an example and that the expert-assisted classifier 200 can solicit input from more or less than three domain experts.

The expert-assisted classifier 200 shown in FIG. 2 can be used to classify a record into one of a plurality of categories. As one example, for psychiatric patient triage applications, a record 210 can be input into the expert-assisted classifier 200. Classifier stage 202a examines record 210 and determines whether record 210 is Class 1 (e.g., a severe case) or not Class 1 (e.g., a moderate, mild, or absent case). If classifier stage 202a determines that record 210 is Class 1, which is shown by arrow 215a, domain expert 204a examines record 210 and determines whether record 210 is Class 1 (e.g., a severe case) or not Class 1 (e.g., a moderate, mild, or absent case). In other words, input is received from domain expert 204a to either validate or contradict output of classifier stage 202a. If domain expert 204a determines that record 210 is Class 1 (i.e., validates classifier stage 202a), which is shown by arrow 220a, then the classification (i.e., Class 1) is confirmed and classification of record 210 is complete. On the other hand, if domain expert 204a determines that record 210 is not Class 1 (i.e., contradicts classifier stage 202a), which is shown by arrow 220b, then classification operations proceed to the next classifier stage as described below. Additionally, if classifier stage 202a determines that record 210 is not Class 1, which is shown by arrow 215b, then classification operations proceed to the next classifier stage as described below.

If not Class 1, classifier stage 202b examines record 210 and determines whether record 210 is Class 2 (e.g., a moderate case) or not Class 2 (e.g., a mild or absent case). If classifier stage 202b determines that record 210 is Class 2, which is shown by arrow 225a, domain expert 204b examines record 210 and determines whether record 210 is Class 2 (e.g., a moderate case) or not Class 2 (e.g., a mild or absent case). In other words, input is received from domain expert 204b to either validate or contradict output of classifier stage 202b. If domain expert 204b determines that record 210 is Class 2 (i.e., validates classifier stage 202b), which is shown by arrow 230a, then the classification (i.e., Class 2) is confirmed and classification of record 210 is complete. On the other hand, if domain expert 204b determines that record 210 is not Class 2 (i.e., contradicts classifier stage 202b), which is shown by arrow 230b, then classification operations proceed to the next classifier stage as described below. Additionally, if classifier stage 202b determines that record 210 is not Class 2, which is shown by arrow 225b, then classification operations proceed to the next classifier stage as described below.

If not Class 2, classifier stage 202c examines record 210 and determines whether record 210 is Class 3 (e.g., a mild case) or not Class 3 (e.g., an absent case). If classifier stage 202c determines that record 210 is Class 3, which is shown by arrow 235a, domain expert 204c examines record 210 and determines whether record 210 is Class 3 (e.g., a mild case) or not Class 3 (e.g., an absent case). In other words, input is received from domain expert 204c to either validate or contradict output of classifier stage 202c. If domain expert 204c determines that record 210 is Class 3 (i.e., validates classifier stage 202c), which is shown by arrow 240a, then the classification (i.e., Class 3) is confirmed and classification of record 210 is complete. On the other hand, if domain expert 204c determines that record 210 is not Class 3 (i.e., contradicts classifier stage 202c), which is shown by arrow 240b, then record 210 is classified as Class 4 (e.g., absent case). Additionally, if classifier stage 202c determines that record 210 is not Class 3, which is shown by arrow 235b, then record 210 is classified as Class 4 (e.g., absent case).

In some implementations, the cascade classifier 202 can optionally be used to provide feedback to the domain expert 204. For example, the system can operate in the training stage where it has access to a gold standard dataset which includes the correct classification for some data points. In that training stage, if expert classification is different from the gold standard, then the system can provide feedback to the domain experts. Such feedback can include, but is not limited to, criteria supporting the classification decision of the classifier stage. For example, the criteria can include one or more parameters upon which the classifier stage based its decision. It should be understood that such feedback can be used to train the domain expert. The domain expert can use the feedback provided by the cascade classifier 202 in order to improve the expert's own performance. In other words, the domain expert can learn from the cascade classifier 202. Alternatively or additionally, this disclosure contemplates monitoring performance of the domain expert 204, e.g., to determine whether or not the domain expert's performance is improving.

It should be appreciated that the logical operations described herein with respect to the various figures may be implemented (1) as a sequence of computer implemented acts or program modules (i.e., software) running on a computing device (e.g., the computing device described in FIG. 3), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
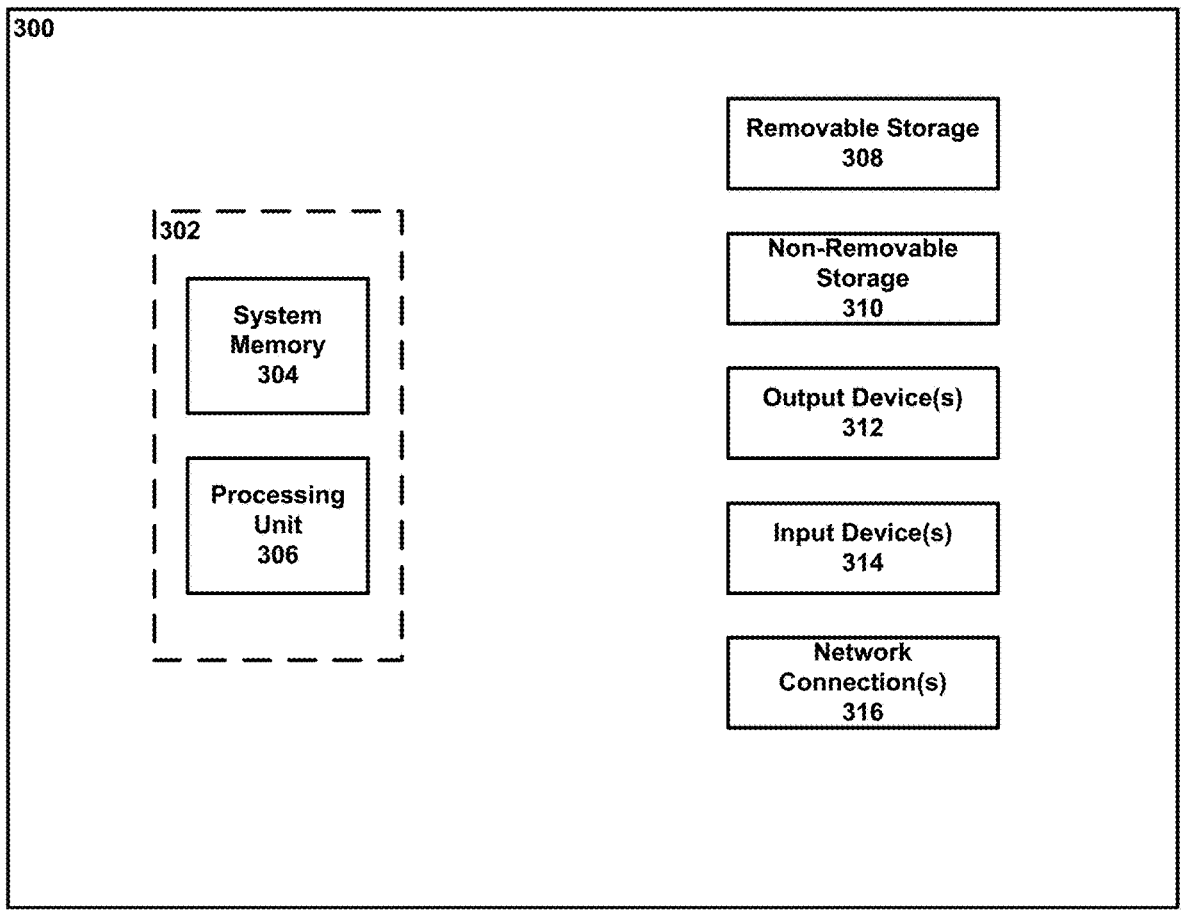
FIG. 3 is an example computing device.

Referring to FIG. 3, an example computing device 300 upon which embodiments of the invention may be implemented is illustrated. The cascade classifier and/or simulated expert stages described herein can be implemented using computing device 300. It should be understood that the example computing device 300 is only one example of a suitable computing environment upon which embodiments of the invention may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. The computing device 300 may also include a bus or other communication mechanism for communicating information among various components of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media and non-removable media implemented in any method or technology for storage of information such as computer readable instructions, data structures, program modules or other data. System memory 304, removable storage 308, and non-removable storage 310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Described herein is a framework and its model, Expert Assisted Cascading Classifier (EACC), for combining machine learning (ML) with human experts for multi-class classification problem wherein different categories are classified sequentially or in a cascaded approach. This is described, for example, with reference to FIG. 2. At the end of classification of each category, experts in the corresponding category verify the outcome and accept or reject the outcome presented by the machine classification algorithm. In case of rejection by human expert, the data point is forwarded in the cascade in the classification for remaining labels in later sequential stages. This is described, for example, with reference to FIG. 2, arrows 220b, 230b, 240c. On the other hand, if the expert of a category accepts the label for a data point, then the same label is assigned to the data point. This is described, for example, with reference to FIG. 2, arrows 220a, 230a, 240a. Also described herein are techniques for explicitly modeling the human experts' accuracies in order to determine if the combined human+ML system performs better or worse than a fully automated ML system alone. This is described, for example, with reference to FIG. 1. Methods like this are particularly important given the recent interest in building augmented intelligence systems (Jain et al. 2018) that combine human experts with artificial intelligence in order to design more effective systems. Realizing the augmented intelligence vision requires methods that can effectively determine when combined human+ML systems outperform traditional ML systems.

There are multiple scenarios where the framework described herein is applicable such as priority classification of information technology (IT) service requests in technical support centers, triaging the severity of patient condition in healthcare, etc. In IT applications, the framework can be used to prioritize or route a service request. For example, the framework can be used to prioritize or route the service request to an appropriate service location in the organization. Additionally, the framework described herein can be used for fraud detection and screening/monitoring of suspicious transactions either for fraud detection, money laundering or other financial purposes. The techniques described herein include a conceptualization to formally represent a human expert for classification problems in terms of key parameters—False Positive Indicator (FPI) rate, False Negative Indicator (FNI) rate, True Positive Indicator (TPI) rate, and True Negative Indicator (TNI) rate. As used herein, FPI=False Positives (FP)/N, FNI=False Negatives (FN)/N, TPI=True Positives (TP)/N, and TNI=True Negatives (TN)/N, where N=(FP+FN+TP+TN). Additionally, the techniques described herein extend traditional cascading classifiers and present a framework for combining cascading classifiers with experts to improve the overall performance of classification. Further, the techniques described herein include specific conditions under which the combination of expert and machine classification will outperform machine classification or expert alone. The EACC classifier may be used as a decision aid to reduce the effort of domain experts, while providing a unique opportunity to include them at each stage to reduce false positive cases and further improve the system's accuracy.

As described herein, the application of EACC in triaging psychiatric patient records has been demonstrated as one of use case. EACC performs better compared to standard multiple category classification algorithms in this case. It has also been demonstrate that the inclusion of experts at each stage of classification improves or degrades the overall performance of the combined system based on the four key parameters of an expert mentioned before. In other words, based on specific accuracies of the human experts available, it is possible to show if the combined system is better or worse than a fully automated system.

The EACC approach achieves higher triage classification accuracy compared to traditional multiclass classification through (1) leveraging the differences between a specific classification category or class and remaining categories by classifying one category at a time (or stage), (2) identifying and applying classifiers at each stage which improves overall accuracy, (3) identifying and applying different features in each stage, and (4) providing a framework to involve domain experts at each stage of classification to further improve the performance of the classification.

A mathematical model has been included to examine conditions in which combination of machine learning and expert system performs better compared to (1) machine learning only (2) expert only conditions, for two class classification, which provides insights to determine the performance of combination of classification algorithm with expert prior to its deployment.

Case 1: Psychiatric Patient Triage

As described above, triaging in healthcare is an important process of determining the severity of patients before routing them to appropriate treatment pathway. The triaging of psychiatric patients is particularly challenging due to variability in triaging standards (Pointers et al., 2001). The information used for triaging psychiatric patients comes from Initial Psychiatric Evaluation (IPE) records. The IPE record contains various information including data related to behavior, relationships, addiction, drugs, etc. A sample IPE record is shown in FIG. 4.

The scales used for triaging in literature present significant variation in assessment of psychiatric cases (Pointer et al. 2001) and lower inter-rater reliability among different such scales (Farrohknia et al. 2013; Chung 2005). The high accuracy for psychiatric patient triage is an important challenge. The digital IPE records provide an opportunity for automation in psychiatric patient triage using machine learning algorithms (Cai et al. 2015). As described herein, it is possible to use classification of IPE records into different risk/severity categories as one use case to demonstrate the application of EACC. The classification of IPE records for triaging psychiatric patients is challenging because automation using machine learning brings scalability and low cost, however, there is risk of misclassification. Therefore, such scenarios warrant hybrid systems wherein the healthcare expert can be combined with the classification system such that the combination not only reduces the overall cost and improves accuracy of triaging but also lowers the risk in cases of misclassification by involving the experts to verify the outcome of machine classification. However, the experts' accuracy levels, as described below, play a key role in determining if the combined system will indeed be better.

Classification models that mirror the triaging mechanism fit well within this framework. One such application in the machine learning literature is cascading classifiers (e.g., cascade classifier 200 in FIG. 2), a special type of ensemble method where sequential or multi-stage classifiers (e.g., classifier stages 202a, 202b, 202c in FIG. 2) are used. The output of a prior classification model informs the next stage or classifier applied in sequence. A multi-stage cascading classifier has been developed for psychiatric patient triage (Singh et al., 2018).

This approach is different from multiclass classifiers wherein all categories are classified at once. Motivated by the need to support triaging scenarios, cascading classifiers, upon which EACC classifier is built, are described herein. Specifically, IPE records can be classified into four classes—severe, moderate, mild, and absent by classifying one class at a time or stage. In each stage, a binary classifier is built to distinguish between a target class (i.e., class intended to be classified) and the rest of the categories (e.g., Classifier 1 models: "severe vs. rest," Classifier 2 models: "moderate vs. rest," Classifier 3 models: "mild vs. absent"). This is described, for example, with reference to FIG. 2. Classification models can be trained at each stage using two approaches—(1) multiclass classification (2) one class vs. rest approach, and the trained model can be used to predict a specific category at each stage. In multiclass classification training, a classifier that trains on all the classes (e.g., four in the IPE use case) at once was built. However, such a classifier is used to predict only the target class. On the other hand, in one class vs. rest approach, the model is trained on the data in which target category samples are labelled with one label and remaining samples with a different label, irrespective of their categories. For example, target category may be labelled as $x \in \{0,1,2,3\}$ and remaining three categories are labelled as '99'.

Case 2: Classifying Helpdesk Support Requests

Everyday millions of helpdesk tickets are generated across companies, and get routed to individuals often through specialized help-desk software. A common problem is ticket re-assignment (e.g., https://happysignals.com/the-real-cost-of-reassigning-it-service-desk-tickets/), where a helpdesk ticket is re-assigned to a different person, often because the first assignment was incorrect. A typical helpdesk ticket may need to be assigned to specific categories, where experts are available, such as "Cloud Infrastructure", "Operating Systems", "Database Support" and so on. The EACC described herein can apply in such a case, where a cascading classifier targets a specific category at each step, and uses a human expert to determine if the ticket classification is correct or not. In such case, modeling the human expert appropriately can help determine whether the helpdesk should use a combined system or revert to a fully automated one.

Expert Assisted Cascading Classifier (EACC)

Cascading classifiers have been used in image pattern recognition literature (Oliveira, Jr, & Sabourin, 2005), wherein images are classified in multiple stages. In the initial stage(s), using a small subset of image features, the images which do not contain required pattern are classified. For example, in case of human face detection, the sample images which do not contain any human face are removed using a simple classifier. In later stage(s), other complex classifier(s) is used to detect human face from the images containing it.

Some research has also demonstrated that the multi-stage classifier is better compared to ensemble methods, such as voting-based selection of best performing classifiers (Alpaydin & Kaynak, 1998, Pudio et al, 1992). AdaBoost or Adaptive Boosting algorithms have been used in conjunction with cascading classifiers to choose the appropriate feature set from the large set of potential features, and has shown to be an effective algorithm for machine learning with strong bounds on the generalization performance (Viola, Way, & Jones, 2004). Moreover, some studies have shown that multistage classifier is better compared to ensemble methods, such as voting-based selection of best performing classifiers (Oliveira & Sabourin, 2005).

Therefore, taking inspiration from the class of cascading classifiers to classify psychiatric cases based on severity, EACC can be implemented by including the expert (e.g., experts 204a, 204b, 204c in FIG. 2) for each stage (e.g., classifier stages 202a, 202b, 202c in FIG. 2) to improve the overall performance of classification.

The cascading framework allows for including experts in between the cascade states for validating the machine outcome. The order of classification of different categories can be determined based on complexity of these categories. As described herein, a search can be performed in which different orders of categories are checked to select a specific order based on the overall accuracy of the classification model. However, if there is specific domain requirement to classify in a specific order, it can also be achieved with the framework described herein by disabling the above mentioned search process. Moreover, at each stage in which a specific category is predicted, it is possible to search for the model which maximizes overall accuracy. This technique is useful in cases where the there is no prior information to help researcher choose a specific category over other.

Pseudo code of an example EACC algorithm is provided below in Algorithm 1. Here, T represents the set of patient records to be used for training the sequence of classifiers and T' represents the set of records in the holdout sample for testing the classification accuracy. In the first step, the set of categories C={severe, mild, moderate, absent} are ordered based on their preference of classification (if provided) guided by a heuristic such as frequency or predictability. In case the specific order is not provided by the domain, it is possible to search over all orders of categories and select the one which provides maximum accuracy. Let C' denotes the ordered classes (i.e., severe, moderate, mild, and absent based on severity). As described herein, the possibilities of determining a cascading sequence based on frequency distribution (high/low) of the classes in the training set or the severity of classes (high/low) are explored.

Algorithm 1—EACC Machine Learning Training Pseudo Code

1. Given the training examples $T=[t_1, t_2 \ldots t_n]$, training class labels $L=[l_1^t, l_2^t \ldots l_n^t]$
2. Given the validation examples $V=[v, v_2 \ldots v_m]$, validation class labels $L'=[l_1^v, l_2^v \ldots l_n^v]$
3. Let, $C=[c_1, c_2 \ldots c_c]$ denote the set of all possible class values.
4. Sort C based on a heuristic (e.g. severity) to get a vector C': $C'=[c'_1, c'_2 \ldots c'_c]$
5. Initialize: $T^1=T$, $V^1=V$
6. Let $A=[a_1, \ldots a_l]$ be the set of classifiers.
7. While $i \leq (c-1)$ {
8. $T=T^i$; $V=V^i$
9. $B_i^T=[b_1^t, b_2^t, \ldots b_n^t]$ such that $b_k^t=1$ if class $(l_k^t)c'_i$ else 0 for any k<n
10. $B_i^V=[b_1^v, b_2^v, \ldots b_m^v]$ such that $b_k^v=1$ if class $(l_k^v)=c'_1$ else 0 for any k<m
11. Relabel the class labels of training instances L and validation instances V such that $l_n=1$.
12. While $j \leq (I)$ {
13. Train classifier $a_j$ on set T using features $F_i$ for binary classification $(B_i^T)$
14. Predict the binary classification $P_{ij}$ for the instances in the validation set V using $a_j$
15. on and the feature set $F_i$ such that $P_{ij}=[p_{ij}=F_1(T, B_i^T, a_j, V), \ldots p_{mij}=F_m(T, B_i^T, a_j, V)]$
16. Return the accuracy $$Acc_{ij} = \sum_{k=1}^{m} (p_{kij} - b_k^v)/m$$

of the classifier
17. }
18. Select the classifier $a_f$ such that $Acc_{ij}=\max(Acc_{ij})$ for any $j \leq I$
19. $MODEL_i=a_f$ (Identified classifier at for the stage i)

20. $T^i = T^i - T^i_{(class(l_k^t)=c'_j)}$
21. $V^i = V^i - V^i_{(class(l_k^V)=c'_j)}$
22. Return (Model)
23.

Next, the best classifier or algorithm from set A (e.g., total of 9 as described herein) of the possible algorithms can be selected to classify C' in sequence at each stage of the cascade. As described herein, the classifier algorithm can be selected from a plurality of supervised binary class/multi-class classification algorithms including, but are not limited to, Nearest Neighbor, radial base function (RBF) support vector machine (SVM), Decision Tree, Random Forest, Naïve Bayes, Quadratic Discriminant Analysis, Linear SVM, Linear Discriminant Analysis, and AdaBoost. The idea is to use the best estimator for a class $c'_i$ at the level of stage i of the cascade. This step is important since the classification accuracy at each level depends on the feature set of the training set. At each stage s of the cascade, in a binary classifier can be trained for classifying the class $c'_s$ against the remaining classes $c'_i$ (i>s) using the feature set $F_i$. In the subsequent stage, 's+1' a new model is trained on the training data $T^i - T^i_{(class(l_k^t)=c'_j)}$ that excludes the records included in the class $c'_s$. The accuracy of the classifier ($a_j$) is accessed on the validation set based on the predictions $P_{ij}$ from the trained model. The model building procedure returns a set of best models (MODEL) at each stage of the cascade for a given sequence of the classes C'. The generated machine learning cascade is combined with human experts at each stage in prediction. The pseudo code for this combination of machine learning and expert of EACC is presented in Algorithm 2. A diagram illustrating example operations for evaluating an expert-assisted classifier (e.g., EACC) is shown in FIG. 1.

Algorithm 2—Combining Machine Learning Outcome and Expert Judgement Pseudo Code

1. Let $U=\{u_1, u_2, \ldots, u_m\}$ represents set of test samples with labels $L_{test}=\{l_1, l_2, \ldots, l_m\}$. Let R=[NA, NA, ..., NA] represents final result set of predicted labels where |R|=m. NA represents NULL.
2. WHILE (j<c){
3. WHILE (i<m+1){
3. Predict label of $l'_i$=Predict ($u_1$)
4. IF($l'_i$==j){
    # The record is sent to expert of class j.
5. IF ($l_i$==j){# The record is correctly classified by machine learning model of class j.
6. expertDecision=Bernoulli (FPI)}
7. ELSE{# The record was misclassified by the machine learning model of class j.
8. expertDecision=Bernoulli (1−FNI)
9. }
10. IF (expertDecision==1 and R[i]==NA){# expert accepts the classification
11. [i]=}
12. }}
Feature Selection To classify IPE records based on symptom severity, a feature extraction framework can be developed to recognize the factors of interest for the classification problem. Upon consulting with domain experts, the feature set can be divided into different feature sets including general information, disorders, symptoms, prior history of patient, treatments, severe consequences, and Brief Psychiatric Rating Scale (BPRS).

In FIG. 1:
Class(x): The category x into which the input data is to be classified
$C_x^M$=Model/Classifier prediction at stage x
$c_x^E$=Expert prediction at stage x
Test$^x$-$_{(c_x^E=class_x \& c_x^M=class_x)}$=Test data at stage x after removing cases for which $C_x^E$=class$_x$ & $C_x^M$=class$_x$
Out$_x$: System outcome in stage x of the cascade.
Data
The features can be categorized into different datasets presented with their details in Table 1 of FIG. 7.

Six hundred and forty nine (649) IPE records were received as part of Neuropsychiatric Genome-Scale and RDoC Individualized Domains (N-GRID) project of Harvard Medical School via participation in CEGS-N-GRID challenge, 2016. One of the fully anonymized sample records is shown in FIG. 4 below. In the example below, an 80:20 train and test split was used.
Results In Table 2 of FIG. 8, the result of EACC model without including the expert are shown. The EACC model provides maximum performance for feature set "baseline+disorder history" where Decision Tree is used for absent cases, Linear Discriminant Analysis is used for severe cases, and Adaboost is used for mild cases and remaining cases are labelled as moderate.

The sequential classifier combination which provides maximum accuracy in performance evaluation without expert shown in Table 2 is selected. The performance of sequential classifier 7 in combination with experts was then investigated, and the results are presented in Table 3 of FIG. 9. The expert validates the machine output in each state of the cascade. For instance, if in the first stage the machine classifies a record as severe, then it would be passed to an expert and if both the machine and expert agree then record is classified as severe otherwise it is included as an input to the next stage of the cascade.

Three different experts were simulated based on their False Positive Indication (FPI) rate and False Negative Indication (FNI) rate which is formally represented as probability. False positive Indication rate is probability that the expert will accept a classification provided by the system when the classification is incorrect. Similarly, False Negative Indication rate of expert is the probability that the classifier will reject an incorrect classification provided by the system. Three experts, i.e., one for each state, with identical FPI rate and FNI rate values were simulated. As observed from Table 3 of FIG. 9, the performance of each of the sequential classifier increases with high quality expert from 71% to 76%. Moreover, the performance of the overall system deteriorates with low quality experts with FPI=0.5, FNI=0.5 and further degrades with FPI=0.9 and FNI=0.9. Surprisingly, the improvement and deterioration of EACC is not uniform across all classifier combinations. As described below, this is further investigated and propositions along with proof to examine the scenarios in which the combination of expert and system performs better than system (Proposition 1) and better than expert (Proposition 2) are provided.

Propositions
Based on the experimental results of EACC, the conditions in which the EACC (combination of system and expert) performs better compared to system alone and expert alone are further investigated and propositions and corresponding proofs are presented below. A notation table is provided in Table 4 of FIG. 10.

Lemma 1: The Accuracy of the classifier is equal to the sum of its True Positive Indicator rate and True Negative Indicator rate.

Proof:

$$Accuracy_c = \frac{TP_c + TN_c}{N} = \frac{TP_c}{N} + \frac{TN_c}{N} = \delta_{TP,c} + \delta_{TN,c}$$

Lemma 2: The precision of the classifier Precision, is equal to $$\frac{\delta_{TP,c}}{\delta_{TP,c} + \delta_{FP,c}}$$

Proof: The precision of the classifier is defined as follows.

$$Precision_c = \frac{TP_c}{TP_c + FP_C} = \frac{\frac{TP_c}{N}}{\frac{TP_c}{N} + \frac{FP_c}{N}} = \frac{\delta_{TP,c}}{\delta_{TP,c} + \delta_{FP,c}}$$

Lemma 3: The negative predicted value, $NPV_c$ of the classifier is equal to $$\frac{\delta_{TN,c}}{\delta_{TN,c} + \delta_{FN,c}}$$

Proof: The negative predictive value of the classifier is defined as follows.

$$NPV_c = \frac{TN_c}{TN_c + FN_c} = \frac{\frac{TN_c}{N}}{\frac{TN_c}{N} + \frac{FN_c}{N}} = \frac{\delta_{TN,c}}{\delta_{TN,c} + \delta_{FN,c}}$$

PROPOSITION 1: In case of two class classification, the combination of expert and system will perform better than the system if the accuracy of the expert is higher than the precision value of the system.

Proof: Consider a two-class classification problem in which the classifier predicts the target class as A or B. Further, the classes which are predicted as A are given to the expert who can either accept the classification or reject it. Therefore, the accuracy of the system is $$Accuracy_{system} = \frac{TP_{system} + TN_{system}}{N}.$$

Using Lemma 1, $Accuracy_{system} = \delta_{TP,system} = \delta_{TP,system} + \delta_{TN,system}$. The system classifies the data into A and B categories and provides the samples predicted as A to the expert. Therefore, the number of samples which is predicted as $A = (\delta_{TP,system} + \delta_{FP,system}) \times N$.

The expert further analyzes these samples and predicts them either as A or B. Those samples which are predicted as A are accepted by the expert and remaining samples classified as B are sent back to the system.

The accuracy achieved on the sample received by the expert$=Accuracy_{expert} \times (\delta_{TP,system} + \delta_{FP,system})$.

Therefore, using Lemma 1, the accuracy of the combined system$=Accuracy_{expert} \times (\delta_{TP,system} + \delta_{FP,system}) + \delta_{TN, system}$ $= (\delta_{TP,expert} + \delta_{TN,expert}) \times (\delta_{TP,system} + \delta_{FP,system}) + \delta_{TN, system}$ Now, if accuracy of the combined system>accuracy of the system $(\delta_{TP,expert} + \delta_{TN,expert}) \times (\delta_{TP,system} + \delta_{FP,system}) + \delta_{TN, system} > \delta_{TP,system} + \delta_{TN,system}$ $\Rightarrow (\delta_{TP,expert} + \delta_{TN,expert}) \times (\delta_{TP,system} + \delta_{FP,system}) > \delta_{TP,system}$ $\Rightarrow (\delta_{TP,expert} + \delta_{TN,expert}) > \frac{\delta_{TP,system}}{\delta_{TP,system} + \delta_{FP,system}}$ Using Lemma 2, $\Rightarrow Accuracy_{expert} > Precision_{system}$ PROPOSITION 2: In case of two class classification, the combination of the expert and system will outperform expert if the negative predictive value (NPV) of the system is higher than experts' accuracy.

Proof: If the accuracy of the combination of expert and system>accuracy of expert Then, $(\delta_{TP,expert} + \delta_{TN,expert}) \times (\delta_{TP,system} + \delta_{FP,system}) + \delta_{TN, system} > (\delta_{TP,expert} + \delta_{TN,expert})$ $\Rightarrow \delta_{TN, system} > (\delta_{TP,expert} + \delta_{TN,expert}) - (\delta_{TP,expert} + \delta_{TN,expert}) \times (\delta_{TP,system} + \delta_{FP,system})$ $\Rightarrow \delta_{TN, system} > (\delta_{TP,expert} + \delta_{TN,expert}) - (\delta_{TP,expert} + \delta_{TN,expert}) \times (\delta_{TP,system} + \delta_{FP,system})$ $\Rightarrow \delta_{TN, system} > (\delta_{TP,expert} + \delta_{TN,expert}) \times \{1 - (\delta_{TP,system} + \delta_{FP,system})\}$ Using Lemma 1, $\Rightarrow \delta_{TN, system} > Accuracy_{expert} \times \{1 - (\delta_{TP,system} + \delta_{FP,system})\}$ $\Rightarrow Accuracy_{expert} < \frac{\delta_{TN,system}}{\{1 - (\delta_{TP,system} + \delta_{FP,system})\}}$ Since, $\delta_{TP,system} + \delta_{FP,system} + \delta_{TN,system} + \delta_{FN,system} = 1$, the above equation can be written as follows.

$\Rightarrow Accuracy_{expert} < \frac{\delta_{TN,system}}{\{(\delta_{TN,system} + \delta_{FN,system})\}}$ Using Lemma 3, $\Rightarrow NPV_{system} > Accuracy_{expert}$

REFERENCES

Alpaydin, E., & Kaynak, C. (1998). Cascading Classifier. KYBERNETIKA, 34 (1998), 3 6 9-3 74.

Cai, X., Perez-Concha, O., Coiera, E., Martin-Sanchez, F., Day, R., Roffe, D., & Gallego, B. (2015). Real-time prediction of mortality, readmission, and length of stay using electronic health record data. Journal Of The American Medical Informatics Association, 23(3), 553-561. http://dx.doi.org/10.1093/jamia/ocv110

Chung, J. (2005). An exploration of accident and emergency nurse experiences of triage decision making in Hong Kong. Accident And Emergency Nursing, 13(4), 206-213. http://dx.doi.org/10.1016/j.aaen.2005.08.003

Farrohknia, N., Castrén, M., Ehrenberg, A., Lind, L., Oredsson, S., & Jonsson, H. et al. (2011). Emergency Department Triage Scales and Their Components: A Systematic Review of the Scientific Evidence. Scandinavian Journal Of Trauma, Resuscitation And Emergency Medicine, 19(1), 42. http://dx.doi.org/10.1186/1757-7241-19-42

Filannino, M., Stubbs, A., & Uzuner, Ö. (2017). Symptom severity prediction from neuropsychiatric clinical records: Overview of 2016 CEGS N-GRID shared tasks Track Journal Of Biomedical Informatics. http://dx.doi.org/10.1016/j.jbi.2017.04.017

Goodwin, T. R., Maldonado, R., & Harabagiu, S. M. (2017). Automatic recognition of symptom severity from psychiatric evaluation records. Journal of Biomedical Informatics, 75, S71-S84. https://doi.org/10.1016/j.jbi.2017.05.020

Jain, H., Padmanabhan, B., Pavlou, P., & Santanam, R. (2018). Call for Papers—Special Issue of Information Systems Research—Humans, Algorithms, and Augmented Intelligence: The Future of Work, Organizations, and Society. Information Systems Research, 29(1), pp. 250-251

Newgard, C., Staudenmayer, K., Hsia, R., Mann, N., Bulger, E., Holmes, J., Fleischman, R., Gorman, K., Haukoos, J. and McConnell, K. (2013). The Cost Of Overtriage: More Than One-Third Of Low-Risk Injured Patients Were Taken To Major Trauma Centers. Health Affairs, 32(9), pp. 1591-1599.Newgard, C. D. et al. The cost of overtriage: More than one-third of low-risk injured patients were taken to major trauma centers. Health Aff. 32, 1591-1599 (2013).

Oliveira, L. S., Jr, A. S. B., & Sabourin, R. (2005). Improving Cascading Classifiers with Particle Swarm Optimization. In Eight International Conference on Document Analysis and Recognition (ICDAR '05).

Overall, J. E., & Gorham, D. R. (1962). The Brief Psychiatric Rating Scale. Psychological Reports, 10(3), 799-812. https://doi.org/10.1016/0165-1781(86)90091-0

Pudil, P., Novovicova, J., Blaha, S., & Kittler, J. (1992). Multistage pattern recognition with reject option. Proceedings., 11th IAPR International Conference on Pattern Recognition. Vol. II. Conference B: Pattern Recognition Methodology and Systems, 92-95. https://doi.org/10.1109/ICPR.1992.201729

Gall, C., Wetzel, R., Kolker, A., Kanter, R. K. & Toltzis, P. Pediatric Triage in a Severe Pandemic: Maximizing Survival by Establishing Triage Thresholds. Crit. Care Med. 44, 1762-8 (2016).

Rotondo, M., C., C. & Smith, R. Resources for optimal care of the injured patient (1sted.). American College of Surgeons, Committee on Trauma. (2014). doi:10.1016/j.jamcollsurg.2005.06.003

Uzuner, Ö., Stubbs, A., & Filannino, M. (2017). A natural language processing challenge for clinical records: Research Domains Criteria (RDoC) for psychiatry. Journal of Biomedical Informatics, 75, S1-S3. https://doi.org/10.1016/j.jbi.2017.10.005

Viola, P., Way, O. M., & Jones, M. J. (2004). Robust Real-Time Face Detection. International Journal of Computer Vision, 57(2), 137-154.

Pointer, J. E., Levitt, M. A., Young, J. C., Promes, S. B., Messana, B. J., & Adèr, M. E. (2001). Can paramedics using guidelines accurately triage patients?. Annals of emergency medicine, 38(3), 268-277.

Elkan, C. (2001, August). The foundations of cost-sensitive learning. In International joint conference on artificial intelligence (Vol. 17, No. 1, pp. 973-978). Lawrence Erlbaum Associates Ltd.

Gormican, S. P. (1982). CRAMS scale: field triage of trauma victims. Annals of emergency medicine, 11(3), 132-135.

Koehler, J. J., Baer, L. J., Malafa, S. A., Meindertsma, M. S., Navitskas, N. R., & Huizenga, J. E. (1986). Prehospital Index: a scoring system for field triage of trauma victims. Annals of emergency medicine, 15(2), 178-182.

Dittmar, M. S., Wolf, P., Bigalke, M., Graf, B. M., & Birkholz, T. (2018). Primary mass casualty incident triage: evidence for the benefit of yearly brief re-training from a simulation study. Scandinavian journal of trauma, resuscitation and emergency medicine, 26(1), 35.

Singh, V. K., Shrivastava, U., Bouayad, L., Padmanabhan, B., lalynytchev, A. and Schultz, S. K., 2018. Machine learning for psychiatric patient triaging: an investigation of cascading classifiers. Journal of the American Medical Informatics Association, 25(11), pp. 1481-1487.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for evaluating an expert-assisted classifier, comprising:
   providing a cascade classifier comprising a plurality of classifier stages;
   providing a simulated expert stage between at least two of the classifier stages, wherein the simulated expert stage is configured to validate or contradict an output of one of the at least two classifier stages;
   classifying each of a plurality of records into one of a plurality of categories using the cascade classifier combined with the simulated expert stage; and
   determining whether the simulated expert stage improves performance of the cascade classifier.

2. The method of claim 1, wherein the simulated expert stage is configured to model human-expert performance.

3. The method of claim 2, wherein the human-expert performance is modeled with a plurality of levels of accuracy.

4. The method of claim 2, wherein the human-expert performance is modeled using a plurality of parameters.

5. The method of claim 4, wherein the parameters comprise False Positive Indicator (FPI) rate, False Negative Indicator (FNI) rate, True Positive Indicator (TPI) rate, and True Negative Indicator (TNI) rate.

6. The method of claim 1, further comprising providing a respective simulated expert stage between each pair of the classifier stages.

7. The method of claim 1, further comprising selecting an order for the classifier stages to improve performance of the expert-assisted classifier.

8. The method of claim 1, further comprising selecting an order for the classifier stages based on pre-determined criteria.

9. The method of claim 1, further comprising selecting a machine learning algorithm for use by at least one of the classifier stages from a plurality of machine learning algorithms.

10. The method of claim 9, wherein the machine learning algorithms comprise a plurality of supervised binary class/multiclass classification algorithms.

11. The method of claim 9, wherein the selected machine learning algorithm improves performance of the at least one of the classifier stages.

12. The method of claim 9, wherein the selected machine learning algorithm improves performance of the expert-assisted classifier.

13. The method of claim 9, wherein the machine learning algorithm is selected based on a feature set analyzed by the at least one of the classifier stages.

14. The method of claim 1, wherein each of the classifier stages is a binary classifier stage.

15. The method of claim 1, wherein if the simulated expert stage is determined to improve performance of the cascade classifier, the method further comprising receiving an input from a domain expert between the at least two of the classifier stages, wherein the input from the domain expert validates or contradicts the output of one of the at least two classifier stages.

16. A method for performing expert-assisted classification, comprising:
    using a cascade classifier to classify a record into one of a plurality of categories, wherein the cascade classifier comprises a plurality of classifier stages; and
    receiving an input from a domain expert between at least two of the classifier stages, wherein the input from the domain expert validates or contradicts an output of one of the at least two classifier stages, wherein if the input from the domain expert validates the output of one of the at least two classifier stages, the method further comprising confirming the record's classification; or wherein if the input from the domain expert contradicts the output of one of the at least two classifier stages, the method further comprising passing the record to a next classifier stage.

17. The method of claim 16, wherein each of the classifier stages is a binary classifier stage.

18. The method of claim 16, wherein each of the classifier stages is configured to execute a machine learning algorithm selected from a plurality of machine learning algorithms.

19. The method of claim 16, further comprising providing feedback to the domain expert.

\* \* \* \* \*